UNITED STATES PATENT OFFICE.

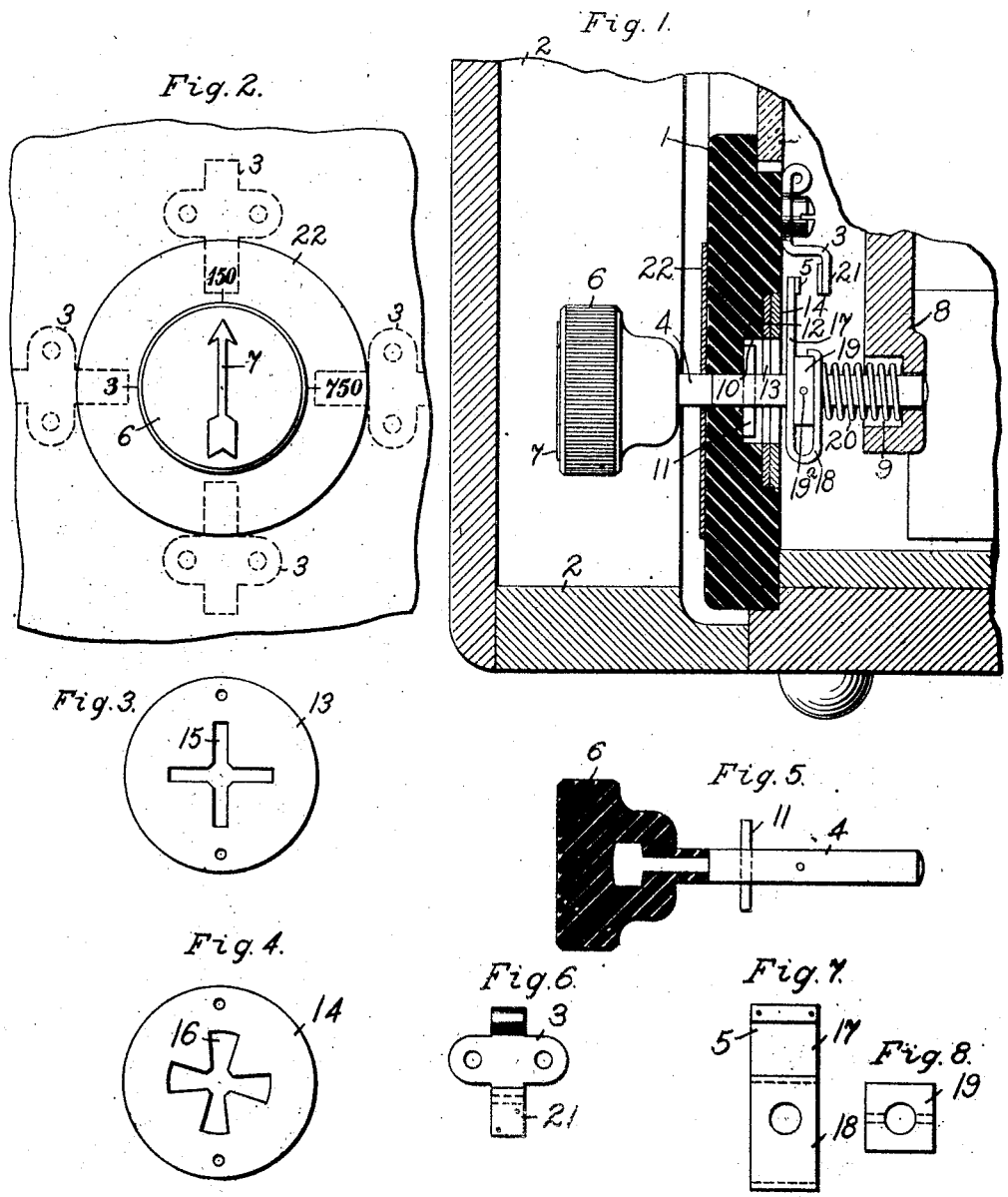

MAURICE C. RYPINSKI, OF PITTSBURGH, PENNSYLVANIA, ASSIGNOR, BY MESNE ASSIGNMENTS, TO WESTINGHOUSE ELECTRIC & MANUFACTURING COMPANY, OF EAST PITTSBURGH, PENNSYLVANIA, A CORPORATION OF PENNSYLVANIA.

METER-SWITCH.

1,049,403.     Specification of Letters Patent.     Patented Jan. 7, 1913.

Application filed January 10, 1908. Serial No. 410,216.

*To all whom it may concern:*

Be it known that I, MAURICE C. RYPINSKI, a citizen of the United States, and a resident of Pittsburgh, in the county of Allegheny and State of Pennsylvania, have invented a new and useful Improvement in Meter-Switches, of which the following is a specification.

My invention relates to switching devices, and it has for its object to provide an improved device of this character that shall be simple in construction and adapted for use with multi-scale electric measuring instruments.

In the prior art, multi-scale meters have usually been provided with a plurality of terminals to which a line conductor could be selectively connected according as the quantities to be measured fell within the range of one or another of the scales.

According to my present invention, I provide a switching device which varies the meter connections so that readings may be made upon any one of a plurality of scales without making any changes in the circuit connections to the meter terminals.

Figure 1 of the accompanying drawings is an elevation of a switching device constructed in accordance with my invention, a portion of the frame of an electric measuring instrument being shown in section. Fig. 2 is a partial front elevation of the matter shown in Fig. 1, and Figs. 3, 4, 5, 6, 7, and 8 are detail views of the switching device.

Referring to the drawings, the device illustrated comprises a stationary plate 1 of insulating material, which may form a part of a meter frame 2, a plurality of stationary contact members 3, an operating rod 4 and a movable contact member 5 secured thereto.

The operating rod 4 is rotatably mounted in the insulating support 1, through which it extends, and is provided at its outer end, with an insulating knob 6, the cylindrical surface of which is preferably milled and the end surface of which is marked with an indicator 7, as shown in Fig. 2. The inner extremity of the rod is supported in a bearing 8 formed in a portion of the meter frame 2 which is counter-bored to form a cup 9.

The insulating plate 1 is provided with a recess 10 which is concentric with the rod 4 and is adapted to receive, and to permit the free rotation of, a cross pin 11 with which the rod is provided. A second recess 12 of greater diameter and less depth than the recess 10, but concentric with it, is provided in the same surface of the plate 1. The recess 12 is of such depth as to contain two disks 13 and 14 which are provided, respectively, with cruciform slots 15 and 16, (see Figs. 3 and 4).

The movable member 5 is preferably formed of resilient conducting material and comprises a contact arm 17, which projects laterally from the rod 4, and a looped body portion 18 which embraces a block 19, as shown in Fig. 8, the block being secured to an intermediate point in the rod 4 by means of a pin 19ª. A helical spring 20 is coiled about the rod 4 and is interposed between the bottom of the cup 9 and the portion 18.

The stationary contact members 3 are similar to each other and are disposed as shown in broken lines in Fig. 2, each comprising an offset projection 21 which is adapted to be engaged by the outer extremity of the movable contact member 5. The spring 20 tends to separate the contact members from each other except when the switch is set in one of its closed positions, as hereinafter explained.

The operation of the switch is as follows: Assuming that the parts occupy positions substantially as shown in Fig. 1 of the drawings; if it is desired to move the contact member 5 into engagement with a contact member 3, the pin 11 being opposite the slots 15 and 16 in the plates 13 and 14, the rod 5 is moved axially in opposition to the spring 20 by pressure applied by an attendant upon the knob 6. If a temporary contact only is desired no rotary motion is imparted to the rod, but, if it is desired to lock the switch in its closed position, a slight rotative movement of the rod is effected. This movement is permitted by reason of the form of the slot 16 in the plate 14, the plate 13 serving, upon the least rotation of the rod, to prevent the separation of the contact members by reason of the engagement of the extremities of the pin 11 with the surface of the plate adjacent to the walls of the slot 15 which is exposed by the wider slot 16. The arrangement of parts is such, however, that it is impossible to rotate the contact member 5 from engagement with one of the contact members 3 directly into engagement with another of said members. When it is desired to change the reading of the meter from one scale to another, the switch must be opened, the rod 4 rotated through the proper angle and the contact members brought into engagement with each other, as before.

By this means, any tendency for a careless operator to change the scale of the meter without making suitable allowance for the external circuit, is minimized.

A dial plate 22 is preferably secured to the outer surface of the insulating plate 1 in order that it may coöperate with the index 7 to indicate the various positions of the switch.

It is conceivable that various structural modifications may be effected within the scope of my invention, and I desire that only such limitations shall be imposed as are indicated in the appended claims.

I claim as my invention:

1. In a switching device, the combination with a rotatively and axially adjustable rod and a single contact member projecting laterally therefrom, of a plurality of stationary contact members disposed circumferentially in substantially the same plane to be severally engaged by the movable contact member and serving as stops therefor, and means for preventing full axial adjustment of said rod to close the switch except when the contact members are in operative angular relation.

2. In a switching device, the combination with a rotatably mounted and axially adjustable rod, and a single contact arm projecting laterally from said rod, of a plurality of stationary contact members arranged substantially in the arc of a circle and in substantially the same plane to be severally engaged by said contact arm and serving as stops therefor, of resilient means for normally holding the movable contact member out of engagement with the stationary contact members, and means for preventing full axial movement of said rod to close the switch except when the contact members are in operative angular relation.

3. In a switching device, the combination with a rotatably mounted and axially adjustable rod, and a resilient contact member projecting laterally from said rod, of stationary contact members arranged substantially in the arc of a circle and in substantially the same plane to be severally engaged by said contact arm and serving as stops therefor, of means for separating the contact members, means for preventing full axial movement of the contact-bearing rod to close the switch except when the movable contact member is in front of a stationary contact member and for locking the contact members in engagement.

4. In a switching device, the combination with a rotatably mounted and axially adjustable rod, and a resilient contact member projecting laterally from said rod, stationary contact members arranged substantially in the arc of a circle and in substantially the same plane to be severally engaged by said contact arm and serving as stops therefor, of a spring for separating the contact members, means for permitting full axial movement of the contact-bearing rod to close the switch only in the contact positions of the contact members and for locking them in engagement with each other in said positions when full axial movement of said rod is effected.

5. In a switching device, the combination with an insulating plate, a plurality of stationary contact members secured thereto and arranged substantially in the arc of a circle, a contact-bearing rod extending through the plate and rotatably mounted therein, a resilient contact member projecting laterally from the rod and adapted to engage the stationary members, an operating knob at one extremity of the rod, a stationary bearing at its opposite extremity, and a spring interposed between the contact arm and the stationary bearing and tending to separate the contact members, of a cross pin secured to the rod between the contact arm and the insulating plate, said plate having a cylindrical recess for the pin, plates located in the outer end of the recess and having cruciform slots to receive said pin, the slot in the outer plate being wider than that in the inner plate in order to hold the contact members in engagement in each of the operative positions of the switch.

6. In a switching device, the combination with an insulating plate having a recess in one face, a plurality of stationary contact members secured to said plate and disposed around said recess, a rod rotatably mounted in said plate, a contact arm projecting laterally from said rod and adapted to engage the several stationary contact members, an operating knob at one end of the rod a stationary bearing for the opposite end of the rod and a spring interposed between the contact arm and the stationary bearing, of a cross pin secured to the rod within the recess in the insulating plate, plates located in the outer end of the recess and having cruciform slots to receive said pin, the slot in the outer plate being wider than that in the inner plate in order to hold the contact members in engagement in each of the circuit-closing positions of the contact arm.

In testimony whereof, I have hereunto subscribed my name this 31st day of Dec., 1907.

MAURICE C. RYPINSKI

Witnesses:
H. W. BROWN,
BIRNEY HINES.